Figure 1:
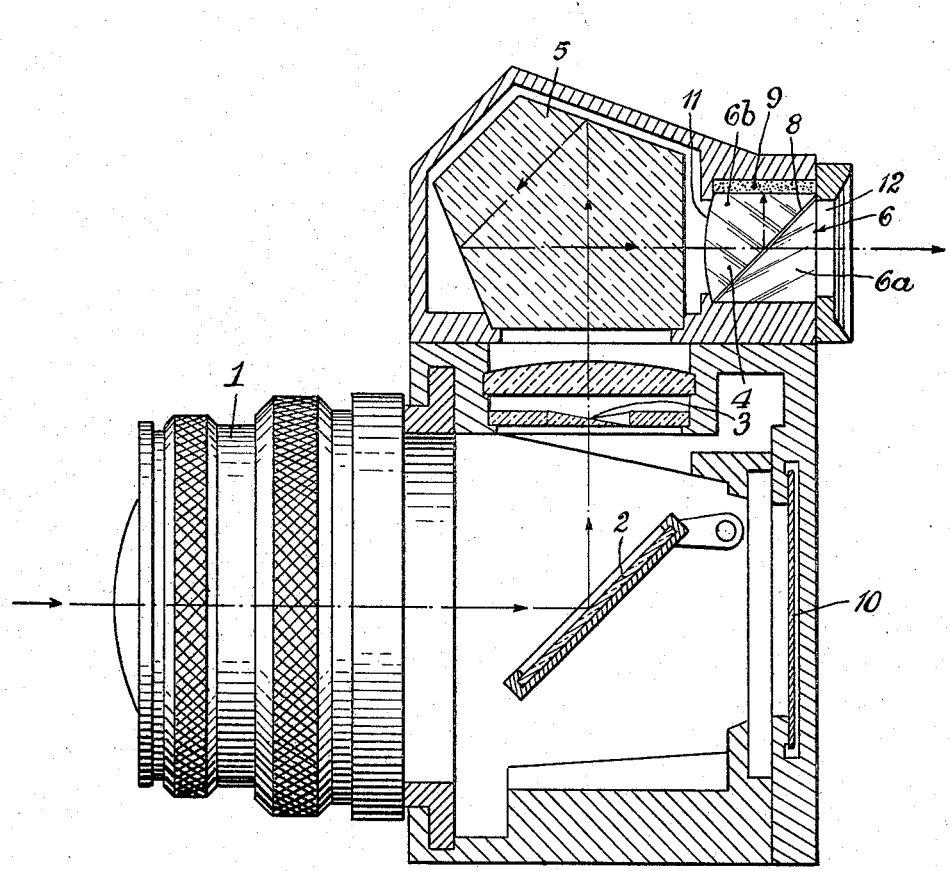

Aug. 9, 1966   H. EBERTZ   3,264,964
SINGLE LENS MIRROR REFLEX CAMERA WITH EXPOSURE METER
Filed Sept. 11, 1963

United States Patent Office 3,264,964
Patented August 9, 1966

3,264,964
SINGLE LENS MIRROR REFLEX CAMERA
WITH EXPOSURE METER
Helmut Ebertz, Stuttgart-Mohringen, Germany, assignor to Zeiss Ikon Aktiengesellschaft, Stuttgart, Germany
Filed Sept. 11, 1963, Ser. No. 308,182
5 Claims. (Cl. 95—42)

The invention relates to a single lens mirror reflex camera provided with a photoelectric exposure meter whose photo element or resistance is illuminated by light rays reflected by a partly transmissive mirror arranged in the viewfinder ray path. This mirror forms with the axis of the viewfinder an angle of about 45°.

It has been proposed heretofore to employ a beam splitting prism as carrier for the partly transmissive mirror layer which is arranged in the diagonal plane of the prism. The beam splitting prism is arranged between the ocular of the viewfinder and a deflecting mirror positioned in front of it, which deflecting mirror may be a penta roof edge prism. This arrangement, however, is regarded to have a substantial disadvantage as may be pointed out in the following.

It is generaly desired, particularly in single lens mirror reflex cameras, to view the image of the object to be photographed in the same size it will appear on the film. Since in reflex cameras the viewfinder image is produced by the photographic objective, the image is reduced in correspondence with the focal length of this objective. In order that the image of the object may be seen in natural size, it has to be viewed through an ocular which offsets the reduction caused by the photographic objective. For this purpose can be used only an ocular whose focal length is the same as that of the photographic objective. A prerequisite for the employment of such an ocular is that it can be arranged at a distance from the focussing plane which corresponds to said focal length as the focal point of the ocular usually lies in the viewfinder plane. Since the roof edge prism required for a side true reproduction of the picture has to be placed in the viewfinder ray path between the focusing plane and the ocular, the aforementioned condition—namely to use the same focal length for the ocular as is used for the photographic objective—cannot always be complied with, not even when the reduction of the optical path by means of the glass body of the roof edge prism is taken into account.

If now the initially mentioned beam splitting prism is placed between the ocular and the roof edge prism, the focal length of the ocular has to be increased quite substantially and this results in a considerable reduction of the viewfinder image.

It is an object of the invention to overcome this disadvantage in that the partly transmissive mirror is arranged between the viewfinder ocular and the eye of the observer in the immediate neighborhood of the ocular. Then the ocular can be moved toward the penta roof edge prism until the desired scale ratio 1:1 for viewing the image of the object to be photographed is reached.

If a beam splitting prism is used as a carrier for the partly transmissive mirror layer—which then lies in the diagonal of the prism—the prism admission surface or its admission and exit surface for the viewfinder ray path is lens-shaped so that the ocular, as was desired, comes to lie in the immediate neighborhood of the penta roof edge prism and, on the other hand, the beam splitting prism is positioned with respect to the ocular in such a manner that the observer's eye can approach the ocular as closely as necessary.

The position of the photo element or of the photo resistance does not depend on the position of the partly transmissive mirror which has to illuminate the photo element. It is expedient, however, to employ the beam splitting prism as a carrier of the photo element and to arrange the photo element on one of the surfaces of the beam splitting prism which are parallel to the viewfinder axis.

Figure 2:
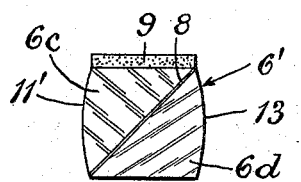

In the drawing which illustrates an embodiment of the invention:

FIG. 1 illustrates in a side elevation view and partly in a vertical section a single lens mirror reflex camera with a beam splitter in the viewfinder, and FIG. 2 is a side elevation view of a modified beam splitter.

Referring to the drawing, FIG. 1 illustrates a single lens mirror reflex camera in which the viewfinder image produced by the camera objective 1 is reflected by the tiltable mirror 2 in the focussing plane 3. This viewfinder image is viewed by means of the ocular 4. The roof edge prism 5 arranged between the focussing plane 3 and the ocular 4 effects a side reversal so that the viewfinder image is reflected true to side and elevation. The ocular 4 is formed by the vertical front face 11 of a beam splitting prism 6 which consists of two parts 6a and 6b. The diagonal separation plane is provided with a partly transmissive mirror layer 8 so that a certain portion of the viewfinder light beam is deflected to the photoelectric layer 9. This layer 9 is arranged on the upper horizontal surface of the part 6b of the beam splitting prism 6 and is connected, in a manner well known, with a measuring instrument arranged on or in the camera.

It will be noted that the diagonally arranged partly transmitting mirror layer 8 is positioned at an angle of substantially 45° to the optical axis of the viewfinder and between the vertical front face 11 which forms the ocular of the finder and the viewing aperture 12 arranged at the rear of the camera casing.

When the tiltable mirror 2 is tilted upwardly, the schematically indicated film 10 will be exposed to the image of the object being photographed by the camera objective 1.

The vertical face 11 of the beam splitting prism 6 facing the interior of the camera or the prism 5 is lens-shaped and forms the viewfinder ocular 4. The integral structure of the ocular and the beam splitting prism reduces the space between the ocular and the eye of the observer, and since the glass path functions within the beam splitting prism, its arrangement in the direction of observation in front of the ocular does not produce any really disturbing distance between the ocular and the eye of the observer.

In a single lens mirror reflex camera the photographic objective in conjunction with the viewfinder arrangement, i.e. ocular and deflecting prism, constitutes a viewfinder telescope with an intermediate image. The present invention, therefore, is also applicable to cameras having a viewfinder arrangement which is separate from the photographic objective, because also in such cameras a compact design of the viewfinder arrangement is desirable and it is therefore advantageous to place the beam splitting prism in viewing direction in front of the ocular.

FIG. 2 illustrates a somewhat modified beam splitting prism 6' in which not only the vertical front face 11' of the part 6c facing the interior of the camera is lens-shaped but also the other vertical face 13 of the part 6d which faces the viewing aperture 12.

What I claim is:

1. In a single objective lens mirror reflex camera provided with a photo-electric element adapted to be connected to a photo-electric exposure meter in which the element is illuminated by a portion of the viewfinder light beam and an ocular for said viewfinder having a viewing aperture, the improvement comprising a partly transmitting mirror arranged between the ocular of the viewfinder and the viewing aperture of the same, said partly transmitting mirror forming an angle of substantially 45° with the optical axis of said viewfinder and deflecting said portion of the viewfinder light beam onto said photoelectric element, the objective and ocular being positioned so that the projection of the pupil of said objective takes place in a plane conjugate to the ocular plane, said photoelectric element being arranged in said projected plane.

2. In a single objective lens mirror reflex camera provided with a photo-electric element adapted to be connected to a photo-electric exposure meter in which the element is illuminated by a portion of the viewfinder light beam and an ocular for said viewfinder having a viewing aperture, the improvement comprising a beam splitting prism arranged between the ocular of the viewfinder and the viewing aperture of the same and having a diagonal partly transmitting mirror layer arranged at an angle of substantially 45° to the optical axis of the viewfinder for deflecting said portion of the viewfinder light beam onto said photo-electric element, the objective and ocular being positioned so that the projection of the pupil of said objective takes place in a plane conjugate to the ocular plane, said photo-electric element being arranged in said projected plane.

3. In a single objective lens mirror reflex camera provided with a photo-electric element adapted to be connected to a photo-electric exposure meter in which the element is illuminated by a portion of the viewfinder light beam and an ocular for said viewfinder having a viewing aperture, the improvement comprising a beam splitting prism arranged between the ocular of the viewfinder and the viewing aperture of the same and having a diagonal partly transmitting mirror layer arranged at an angle of substantially 45° to the optical axis of the viewfinder for deflecting said portion of the viewfinder light beam onto said photo-electric element, said ocular being formed by a vertical lens-shaped surface on said beam splitting prism, said lens-shaped surface facing the interior of said camera, the objective and ocular being positioned so that the projection of the pupil of said objective takes place in a plane conjugate to the ocular plane, said photo-electric element being arranged in said projected plane.

4. In a single objective lens mirror reflex camera provided with a photo-electric element adapted to be connected to a photo-electric exposure meter in which the element is illuminated by a portion of the viewfinder light beam and an ocular for said viewfinder having a viewing aperture, the improvement comprising a beam splitting prism arranged between the ocular of the viewfinder and the viewing aperture of the same and having a diagonal partly transmitting mirror layer arranged at an angle of substantially 45° to the optical axis of the viewfinder for deflecting said portion of the viewfinder light beam onto said photo-electric element, said beam splitting prism having opposed vertical lens-shaped surfaces serving as light admitting and light exit faces for said viewfinder light beam, the objective and ocular being positioned so that the projection of the pupil of said objective takes place in a plane conjugate to the ocular plane, said photoelectric element being arranged in said projected plane.

5. In a single objective lens mirror reflex camera provided with a photo-electric element adapted to be connected to a photo-electric exposure meter in which the element is illuminated by a portion of the viewfinder light beam and an ocular for said viewfinder having a viewing aperture, the improvement comprising a beam splitting prism arranged between the ocular of the viewfinder and the viewing aperture of the same and having a diagonal partly transmitting mirror layer arranged at an angle of substantially 45° to the optical axis of the viewfinder for deflecting said portion of the viewfinder light beam onto said photo-electric element, said beam splitting prism having two surfaces extending parallel to the optical axis of said viewfinder, whereby one of said surfaces serving as a carrier of said photo-electric element, the objective and ocular being positioned so that the projection of the pupil of said objective takes place in a plane conjugate to the ocular plane, said photo-electric element being arranged in said projected plane.

References Cited by the Examiner
UNITED STATES PATENTS

| | | | |
|---|---|---|---|
| 3,103,150 | 9/1963 | Lange | 95—42 |
| 3,127,809 | 4/1964 | Denk | 95—42 X |

JOHN M. HORAN, *Primary Examiner.*